US012785583B2

(12) United States Patent
Kacetl et al.

(10) Patent No.: US 12,785,583 B2
(45) Date of Patent: Nov. 3, 2026

(54) MULTILEVEL MODULATION

(71) Applicant: Rimac Technology LLC, Sveta Nedelja (HR)

(72) Inventors: Jan Kacetl, Pardubice (CZ); Tomáš Kacetl, Pardubice (CZ); Wasim Sarwar Dilov, Zagreb (HR)

(73) Assignee: RIMAC TECHNOLOGY LLC, Sveta Nedelja (HR)

( * ) Notice: Subject to any disclaimer, the term of this patent is extended or adjusted under 35 U.S.C. 154(b) by 142 days.

(21) Appl. No.: 18/907,679

(22) Filed: Oct. 7, 2024

(65) Prior Publication Data

US 2025/0119067 A1 Apr. 10, 2025

(30) Foreign Application Priority Data

Oct. 9, 2023 (EP) .................................... 23202347

(51) Int. Cl.

*H02M 7/483* (2007.01)
*H02M 1/00* (2006.01)
*H02M 7/5395* (2006.01)

(52) U.S. Cl.

CPC ........... *H02M 7/483* (2013.01); *H02M 1/007* (2021.05); *H02M 7/5395* (2013.01)

(58) Field of Classification Search

CPC .... H02M 7/483; H02M 1/007; H02M 7/5395; H02M 7/4835; H02M 1/0067; H02M 7/44; H02M 7/00; H02M 7/42; H02M 7/539; H02M 7/68; H02M 7/797; H02M 7/49

See application file for complete search history.

(56) References Cited

U.S. PATENT DOCUMENTS

2017/0110977 A1* 4/2017 Mihalache .............. H02M 7/49

OTHER PUBLICATIONS

Diao et al., "Modified Phase-Shifted PWM for Cascaded Half-Bridges of Photovoltaic Application," IEEE Access, 2020, vol. 8.

EPO, Extended European Search Report for EP Application No. 23202347.3, Jan. 26, 2024.

Li et al., "Multi-module Capacitor Voltage Measuring Technique of Modular Multilevel Converters Based on Sampling Instant Classification", Measurement, Institute of Measurement and Control, 2021.

* cited by examiner

*Primary Examiner* — Jung Kim

(74) *Attorney, Agent, or Firm* — Hodgson Russ LLP

(57) ABSTRACT

A method for controlling a multilevel converter is provided. The method can comprise providing a carrier signal for each of a plurality of power converter modules; assigning a first number N of the plurality of power converter modules to a first group of power converter modules; assigning at least one second number M of the plurality of power converter modules to at least one second group of power converter modules; controlling the switching state of each of the first number N of the plurality of power converter modules based on the carrier signal provided for each of the first number N of the plurality of power converter modules for generating a first output signal; and controlling the switching state of each of the at least one second number M of the plurality of power converter modules for generating a second output signal.

13 Claims, 8 Drawing Sheets

MULTILEVEL MODULATION

CROSS-REFERENCE

This application claims priority to European Patent Application No. 23202347.3, filed Oct. 9, 2023, the entire disclosure of which is incorporated herein by reference.

FIELD

The present invention relates to the technical field of multilevel modulation. More particularly, the present invention relates to a multilevel converter and a method for controlling a multilevel converter.

BACKGROUND

A multilevel converter is a power conversion system that can generate a multistep (multilevel) voltage waveform from several DC input voltages. The multistep voltage waveform has at least three levels. The number of levels of the multilevel converter can be defined as the number of steps or constant voltage levels that can be generated by the multilevel converter between the output terminal and any arbitrary internal reference node.

A multilevel converter is described for example in J. Rodriguez at al.: "Multilevel converters: An enabling technology for high-power applications", Proceedings of the IEEE, vol. 97, no. 11, pages 1786-1817, 2009.

The multilevel converter finds a vast application in many technology fields, amongst others in the field of power conversion, for example in motor vehicles or stationary energy storage systems. Other technology fields or applications may involve power grid applications, medical applications etc.

There are many different topologies for a multilevel converter, like for example, a diode clamped multilevel converter, flying capacitors multilevel converter and cascaded multilevel converter, but also combinations and variations thereof are readily utilized. Some of these topologies, like the flying capacitors multilevel converter and the cascaded multilevel converter have a modular structure composed of multiple power converter modules, also called cells.

The output voltage of a multilevel converter is typically synthesized by a multilevel modulation technique. Several multilevel modulation techniques are applicable to a multilevel converter. The modulation techniques for a multilevel converter can be classified depending on the average switching frequency with which they operate into low switching frequency technique and high switching frequency technique. An example of a high frequency switching technique is a multicarrier pulsed width modulation (multicarrier PWM). Examples of a multicarrier PWM are a phase shifted carrier PWM (PSC PWM) and a level shifted carrier PWM (LSC PWM) which are among the most popular modulation techniques.

These modulation techniques can be easily implemented on a microcontroller, a field programmable gate array (FPGA) or an application specific integrated circuit (ASIC). These multicarrier PWM techniques use a carrier waveform signal for each of the power converter modules of the multilevel converter.

The phase shifted carrier PWM (PSC PWM) evenly distributes the conduction times of the individual power converter modules of the multilevel converter and effectively increases the effective output switching rate of the multilevel converter but does not allow for active control of the conduction times of the individual power converter modules to balance them in the distribution of the workload between the individual power converter modules.

The level shifted carrier PWM (LSC PWM) does not distribute the conduction times of individual power converter modules evenly but utilizes, as a balancing algorithm, sorting based algorithm of the individual power converter modules of the multilevel converter and carrier waveform signals swapping.

Hence, each modulation technique has its own drawbacks and advantages, and the applied modulation technique depends strongly on the field of application of the multilevel converter. Accordingly, the balancing in the distribution of the workload between the individual power converter modules of the multilevel converter depends strongly on the applied modulation technique.

Therefore, there is a need for improved modulation method for a multilevel converter.

Accordingly, it is an object of the present invention to provide for an improved modulation method for a multilevel converter.

SUMMARY

The mentioned problems and drawbacks are addressed by the subject matter of the independent claims. Further preferred embodiments are defined in the dependent claims.

In a first aspect of the present invention there is provided a method for controlling a multilevel converter for generating a multilevel output signal, the multilevel converter comprising a plurality of energy sources and a plurality of power converter modules, each power converter module comprising at least two switching elements, the method comprising:

- providing a carrier signal for each of the plurality of power converter modules;
- assigning, based on at least one first variable parameter, a first number N of the plurality of power converter modules to a first group of power converter modules;
- assigning, based on the at least one first variable parameter, at least one second number M of the plurality of power converter modules to at least one second group of power converter modules;
- controlling the switching state of each of the first number N of the plurality of power converter modules assigned to the first group based on the carrier signal provided for each of the first number N of the plurality of power converter modules for generating a first output signal; and
- controlling the switching state of each of the at least one second number M of the plurality of power converter modules assigned to the at least one second group based on the carrier signal provided for each of the at least one second number M of the plurality of power converter modules for generating a second output signal,
- wherein the carrier signals provided for each of the first number N of the plurality of power converter modules form a first group of carrier signals and the carrier signals provided for each of the at least one second number M of the plurality of power converter modules form a second group of carrier signals, wherein the first group of carrier signals is phase shifted with respect to the second group of carrier signals for a group phase shift.

In a second aspect of the present invention there is provided a multilevel converter for generating a multilevel output signal, the multilevel converter comprising a plurality of energy sources and a plurality of power converter modules, each power converter module comprising at least two switching elements, the multilevel converter comprising means adapted to execute the steps of the method of the first aspect.

In a third aspect of the present invention there is provided a computer program comprising instructions which, when the program is executed by a computer causes the computer to execute the steps of the method of the first aspect.

BRIEF DESCRIPTION OF THE DRAWINGS

Embodiments of the present invention, which are presented for better understanding the inventive concepts, but which are not to be seen as limiting the invention, will now be described with reference to the figures in which.

DETAILED DESCRIPTION

Figure 1:
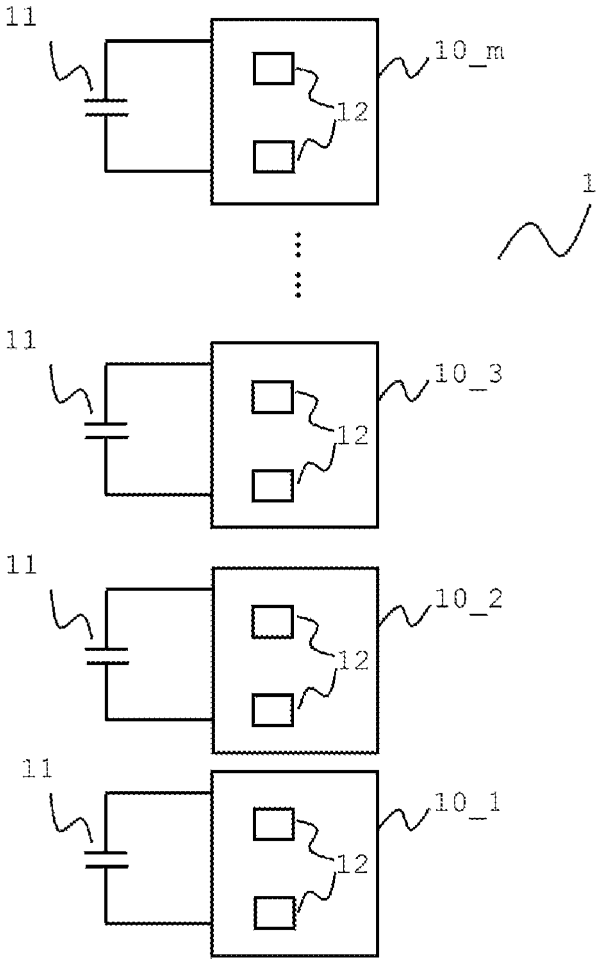
FIG. 1 is a schematic block diagram of a multilevel converter according to an embodiment of the present invention.

FIG. 1 shows a schematic block diagram of the multilevel converter 1 according to an embodiment of the present invention. The multilevel converter 1 comprises a plurality of energy sources 11 and a plurality of power converter modules 101, 102, 10_3, . . . **10_*m*. Each power converter module 10_*i* (i=1 . . . m) comprises at least two switching elements 12. Each one of the at least two switching elements 12** may be a solid-state switching element, like for example a two terminal solid-state switch or a three terminal solid-state switch. Examples of two-terminal solid-state switch include, without limiting the present invention, a PIN (positive-intrinsic-negative) diode and Schottky diode. Examples of a three-terminal solid-state switch include, without limiting the present invention, MOSFET, JFET, IGBT, BJT and thyristor.

It is to be understood that even though FIG. 1 shows each energy source 11 as being connected to a respective one of the power converter modules 10_1, 10_2, 10_3, . . . **10_*m*, this is not limiting, and other connecting configurations are also possible. The energy source 11 may be any kind of energy source, like for example a battery, a photovoltaic cell, a fuel cell, an electromechanical power converter or a capacitive energy source. Any of these energy sources can be further equipped with one or more converter stages such as a rectifier, a dc-dc converter (for example maximum power point tracking for photovoltaic systems) and similar. It is further to be understood that the present invention is not limited to a specific topology of the multilevel converter 1. For example, the power converter modules 10_1, 10_2, 10_3, . . . , 10_*m* may be connected in a string and a plurality of such strings may be provided in the multilevel converter 1. Each string may have an input terminal and an output terminal. Each string may represent a phase or an arm of the multilevel converter 1**.

Figure 2:
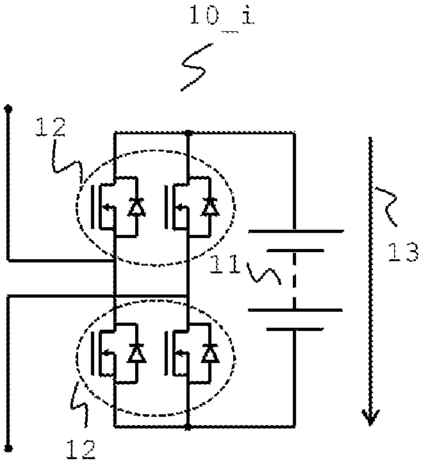
FIG. 2 is a schematic representation of a power converter module of the multilevel converter according to an embodiment of the present invention.

There is shown in FIG. 2 a schematic representation of a power converter module **10_*i* of the multilevel converter 1 according to the embodiment of the present invention. In this embodiment of the present invention, each switching element 12 may be seen as a collection of several solid-state transistors and diodes. However, this is not limiting and each switching element may be represented with a single solid-state transistor or a diode. The energy source 11 may be a single energy source or a collection of several energy sources or an anergy source equipped with one or more converter stages. The arrow 13 shows the output voltage of the power converter module 10_*i***.

In the multilevel converter 1, depending on how the individual power converter modules 10_1, 10_2, 10_3, . . . , **10_*m* of the multilevel converter 1 are connected together, the distribution of energy conversion (workload or load) between the different power converter modules 10_1, 10_2, 10_3, . . . , 10_*m* can be controlled. For the distribution of the energy conversion and hence for the distribution of the workload (load) between the power converter modules 10_1, 10_2, 10_3, . . . , 10_*m*, at least the following factors play a role: i) the modulation technique to be applied to the power converter modules 10_1, 10_2, 10_3, . . . , 10_*m* of the multilevel converter, which comprises determining how many power converter modules 10_1, 10_2, 10_3, . . . , 10_*m* will participate in the energy conversion, which in turn depends on the number of required voltage levels of the demanded output voltage of the multilevel converter, and ii) the scheduling of the individual power converter modules 10_1, 10_2, 10_3, . . . , 10_*m* of the multilevel converter for energy conversion, which comprises determining which power converter modules will participate in the distribution of the energy conversion (workload or load). The scheduling controls therefore the distribution of the workload (load) between the individual power converter modules 10_1, 10_2, 10_3, . . . , 10_*m*** of the multilevel converter.

As elaborated above, popular examples of modulation technique are the phase shifted carrier PWM (PSC PWM) and the level shifted carrier PWM (LSC PWM). Both in PSC PWM and LSC PWM a carrier waveform signal is provided to each power converter module. In the following, the expressions “carrier waveform signal” and “carrier signal” may be interchangeably used.

The level shifted carrier PWM can simply be implemented on one or more microcontrollers and can use multiple PWM peripherals. In the level shifted carrier PWM, the carrier waveform signals for the individual power converter modules are arranged to have different amplitude levels. The carrier waveform signals are arranged in a vertical shift. Except for the first and the last carrier waveform signal, each carrier waveform signal is set between two voltage levels.

However, as elaborated above, the level shifted carrier PWM (LSC PWM) does not distribute the conduction times of individual power converter modules evenly since, at least within a control period, only one module is responsible for modulation and hence contributes to the generation (synthesis) of the demanded (required) output voltage, while the others are bypassed. Additionally, series connected power converter modules with a carrier waveform signal below the reference signal, also contribute to the generation of the demanded (required) output voltage. To account for the uneven distribution of the conduction times of individual power converter modules the level shifted carrier PWM utilizes, as a balancing algorithm, sorting based algorithm of the individual power converter modules of the multilevel converter and carrier waveform signals swapping.

On the other hand, the phase-shifted carrier PWM evenly distributes the conduction times of individual power converter modules within a control period. In the phase shifted carrier PWM, a phase shift is introduced between the carrier waveform signals for the individual power converter modules, producing a phase shifted switching between the individual power converter modules.

Figure 3:
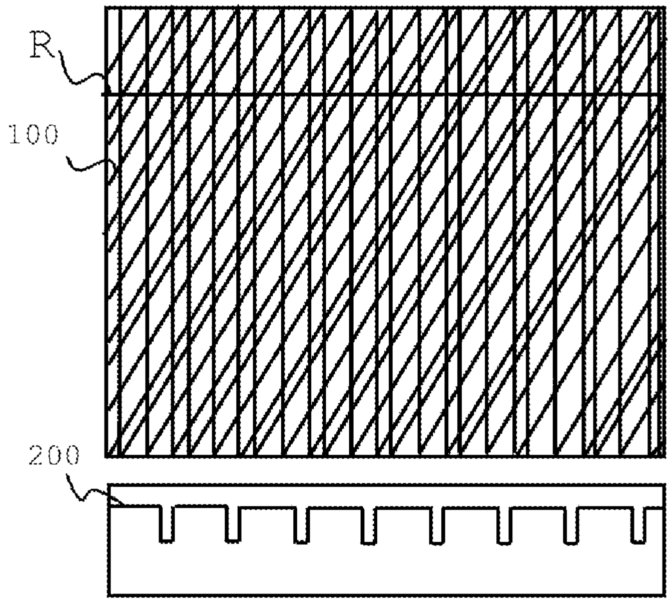
Figure 3 (prior art)
FIG. 3 shows a phase shifted carrier PWM according to a conventional solution.

In the phase-sifted carrier PWM all power converter modules contribute to the generation (synthesis) of the demanded (required) output voltage and there is a phase shift between their carrier signals. There is shown in FIG. 3 an example of the phase-shifted carrier PWM according to the conventional application. There are shown on the upper graph the carrier signals 100 for the individual power converter modules. The carrier signals are phase shifted with respect to each other. The provided reference signal R is also shown. The demanded (required) output voltage is shown on the lower graph. The horizontal axis of each of the graphs represents time. The unit may be for example ms or s. The vertical axis represents voltage. The unit may be V or mV. Each of the carrier signals shown in the upper graph in FIG. 3 has an asymmetrical waveform. More specifically, the waveform is a sawtooth waveform. However, the carrier signals may also have a symmetrical waveform.

The phase shifted carrier PWM evenly distributes the conduction times of the individual power converter modules within a control period. However, the phase shifted carrier PWM does not provide for active control of the conduction times of individual power converter modules within a control period. On the other hand, the level shifted carrier PWM provides for active control of the conduction times of individual power converter modules in cycles, however, does not provide for a high output effective switching rate.

Both in level shifted carrier PWM and phase shifted carrier PWM, for each power converter module 10_*i* the corresponding carrier waveform signal is compared to the corresponding reference signal R for generating a control signal for controlling the switching state of the at least two switching elements 12 in the corresponding power converter module 10_*i*. The reference signal may be a common reference signal for all power converter modules 10_1, 10_2, 10_3, . . . , 10_*m*, or a reference signal may be provided for each power converter module 10_*i*. In this way, the switching state of the corresponding power converter module 10_*i* is controlled. In other words, the switching state and hence the scheduling of each power converter module 10_*i* (when to place the power converter modules 10_*i* to be in a conduction state) is controlled based on the comparison between the reference signal R and the corresponding carrier waveform signal. Normally, when the reference signal is above the carrier signal, the control signal controls the corresponding power converter module to be placed in a conduction state.

However, the conventional phase shifted carrier PWM produces noise at the module switching rate and its harmonics, which may fall in the resonance of the output filter and cause stability issues with the output signal. For example, if 8 power converter modules are used with a module switching rate of each power converter module of 10 kHz, the output signal may exhibit a noise at 80 kHz. If a reference signal is provided for each power converter module (instead of providing a common reference signal), a noise may occur at 10 kHz (subharmonic from 80 kHz). Further, as elaborated above, in phase shifted carrier PWM it is not possible to dynamically control the switching state of individual power converter modules within a control period.

The present invention provides for a novel modulation technique, which unlike the conventional phase shifted carrier PWM and the conventional level shifted carrier PWM provides both for phase shifted operation, which increases the effective switching rate and provides for balancing capability. Further, the provided modulation technique does not introduce additional distortion in the output signal and its harmonic components.

The modulation technique according to the present invention is based on carrier signals grouping and hence is based on grouping of the individual power converter modules. “Grouping” may be seen as assigning the individual power converter modules to at least two groups. In a preferred embodiment of the present invention, each group may comprise two or more power converter modules. However, it is sufficient that at least one power converter module is assigned to a first group and at least two power converter modules are assigned to one further (second) group.

Figure 4:
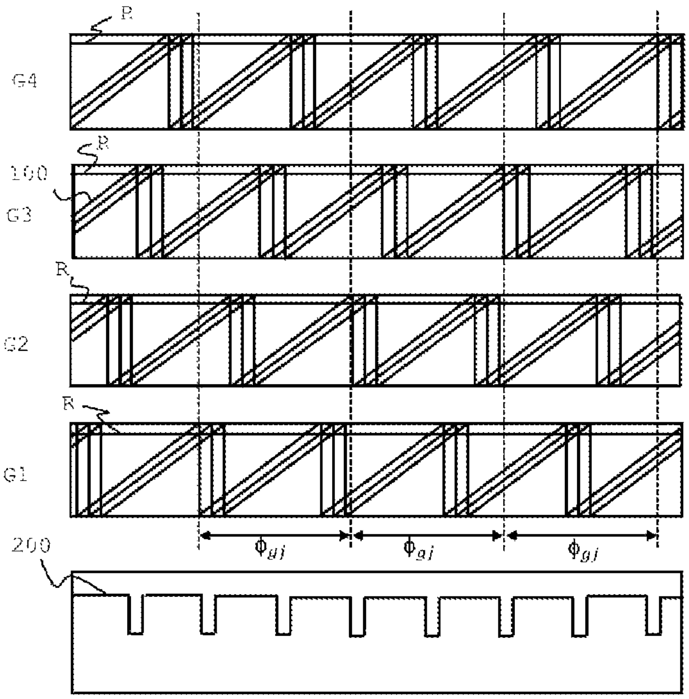
FIG. 4 shows a modulation technique according to an embodiment of the present invention.

This grouping of power converter modules and therefore of carrier signals in one embodiment of the present invention is shown in FIG. 4. In the bottom part of FIG. 4 the demanded output voltage of the multilevel converter 1 is shown. As an example, in this embodiment of the present invention, there is shown in FIG. 4 that the carrier signals and hence the power converter modules are grouped into four groups G1, G2, G3, G4, however, this is not mandatory, since the number of groups according to the modulation technique of the present invention is at least two groups, as indicated above. Further, there is shown in FIG. 4 that each group comprises three power converter modules, however, this is not mandatory. It is sufficient that at least one group has two or more than two power converter modules. The other one or more groups may each have one or more than one power converter modules.

Further, there is shown in FIG. 4 that the carrier signals have an asymmetrical waveform, and more specifically have a sawtooth waveform. However, this is not mandatory, and the carrier signals may have an asymmetrical waveform different from the one shown in FIG. 4 or may have a symmetrical waveform, for example a triangular waveform. The groups of carrier signals are evenly phase shifted for a group phase shift $\varphi_{gj}$. The vertical dashed lines are a guide to the eye for visualising and illustratively representing the group phase shift between the different groups of carrier signals. Again, the horizontal axis of each of the graphs represents time. The unit may be for example ms or s. The vertical axis represents voltage. The unit may be V or mV. There is further shown in FIG. 4 that within each group, the carrier signals are also phase shifted with respect to each other.

In some embodiments of the present invention, the same reference signal R may be used for all groups G1, G2, G3, G4. In other embodiments of the present invention, multiple reference signals can be generated, one reference signal being provided for each group G1, G2, G3, G4. As will be elaborated further below, the reference signal R provided for each group G1, G2, G3, G4 is split to a number of reference signal components and more specifically is split such that one reference signal component is provided to each of the power converter modules assigned to the group.

The carrier signals in each group G1, G2, G3, G4 are phase shifted to align falling and raising edges of the generated control signals for the corresponding power converter modules in each of the groups G1, G2, G3, G4. For each power converter module 10_*i*, the corresponding control signal is generated based on the comparison of the corresponding reference signal component with the corresponding carrier signal. The reference signal component may be determined based on the modulation index for the power converter module.

Providing the phase shift between the carrier signals in each group G1, G2, G3, G4 provides a degree of freedom to set different modulation indexes (mod_i) for different power converter modules within a group. To keep the demanded modulation index (mod) in the multilevel converter 1 unchanged, the sum of all modulation indexes in the group must be equal to the demanded modulation index (mod):

$$\text{mod} = \text{mod}_j = \sum\nolimits_{i=1}^{m} \text{mod}_{j,i} \quad (1)$$

where $j \in \{1, \ldots, n\}$ is the group index and $i \in \{1, \ldots, m\}$ is the power converter module index in the corresponding group, n is the number of groups and m is the number of power converter modules assigned to the group. Any mathematical operation can be used for modulation index modification for individual power converter modules in the groups, preferably addition, subtraction of multiplication. The modulation index modification for an individual particular power converter module may be seen as the modification of the demanded modulation index to thereby derive the modulation index for the individual power converter module.

Conventionally, the demanded modulation index is defined as ratio of the demanded output voltage, Vo, to the maximum output voltage, Vmax: mod=Vo/Vmax.

In two-level converters, the maximum voltage is equal to the dc-link voltage. In multilevel converters, the maximum voltage is a sum of all module voltages in the string.

Different than this conventional approach, in embodiments of the present invention, the maximum voltage, Vmax, is limited to a sum of average voltages of each group. Therefore, the maximum voltage, Vmax, changes with changing the number of groups and consequently, considering the same value of demanded output voltage, Vo, the modulation index changes. The demanded output voltage, Vo, has to be taken into account when forming groups. To reach maximum output voltage, Vmax, the number of groups should be maximized.

Figure 5:
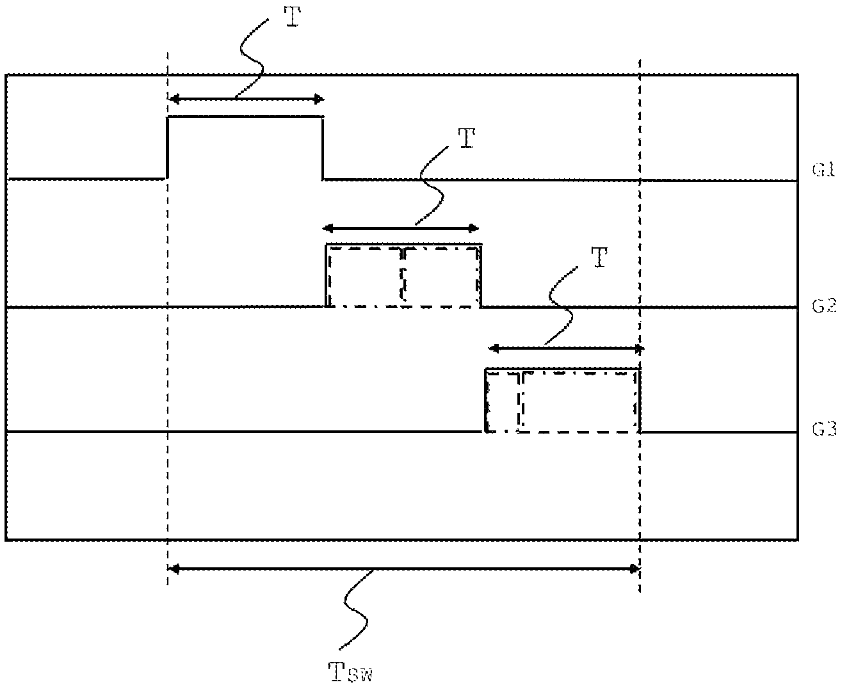
FIG. 5 shows the modulation technique according to an embodiment of the present invention.

This concept in one embodiment of the present invention is shown in FIG. 5. In this embodiment of the present invention, three groups of power converter modules are formed. In other words, the power converter modules, all or only a part of them, are assigned to three groups G1, G2, G3. The first group G1 includes a single power converter module while the second group G2 and the third group G3 each include two power converter modules. Conventionally when applying phase shifted carrier PWM, the three output signals (represented with full line) to generate, by way of their addition, the required output signal for one switching period $T_{SW}$ of the required output signal $T_{SW}$, may be generated by three power converter modules each being in a conduction state for a time period T equal to one third of the switching period $T_{SW}$.

In this embodiment of the present invention, the same output voltage is achieved with five power converter modules assigned to three groups G1, G2, G3. One power converter module is assigned to the first group G1 and is in a conduction state for the time period T equal to one third of the switching period $T_{SW}$. Each of the power converter modules assigned to the second group G2 is in a conduction state for half of the time period T. Again, the time period T is equal to one third of the switching period $T_{SW}$. This is shown with the dashed and the dashed-dotted line respectively. In the third group G3, the one power converter modules assigned to the third group G3 is in a conduction state for one third of the time period T, while the other one power converter module is in a conduction state for the rest of the time period T, or for two thirds of the time period T. This is shown with the dashed and the dashed-dotted line respectively. Again, the time period T is equal to one third of the switching period $T_{SW}$.

It is to be noted that the dashed line and the dashed-dotted line do not coincide with the full line out of illustrative purposes.

Hence, the output signals of each of the groups G1, G2 and G3 are phase shifted with respect to each other for a group phase shift. The group phase sift is equal to the time period T. Further, the output signals of each of the groups G1, G2 and G3 are phase shifted with respect to each other in the same way as the output signals of three power converter modules each being in a conduction state for the time period T equal to one third of the switching period $T_{SW}$, when applying a conventional phase shifted carrier PWM.

Within each one of the groups to which more than one power converter modules are assigned, in this embodiment the second group G2 and the third group G3, when one power converter module is switched OFF another power converter module is switched ON at the same time. The amount of time during which within each group each power converter module is switched ON is determined by the reference signal component provided to each of the power converter modules. By tailoring the corresponding reference signal components, it is therefore possible to tailor the amount of time during which within each group each power converter module is switched ON. Since within each group, when one power converter module is switched OFF another power converter module is switched ON at the same time, a uniform output signal of each group is generated.

As evident from FIG. 5, the sum of the modulation indexes for the power converter modules assigned to each of the second group G2 and the third group G3 is equal to the demanded modulation index. In other words, the demanded modulation index is modified for each of the power converter modules assigned to each of the second group G2 and the third group G3. The modification may be seen as distributing the demanded modulation index among the power converter modules assigned to the group. In this embodiment, since in the first group only one power converter module is assigned, the demanded modulation index corresponds to the modulation index of the power converter module assigned to the first group.

The assignment of the power converter modules to the different groups as well as the degree of modification of the demanded modulation index for determining the modulation index for each of the power converter modules within each of the groups may be based on any one of temperature, current, voltage, state of health, demanded output voltage and a state of charge of each one of the plurality of energy sources, or a combination thereof.

Figure 6:
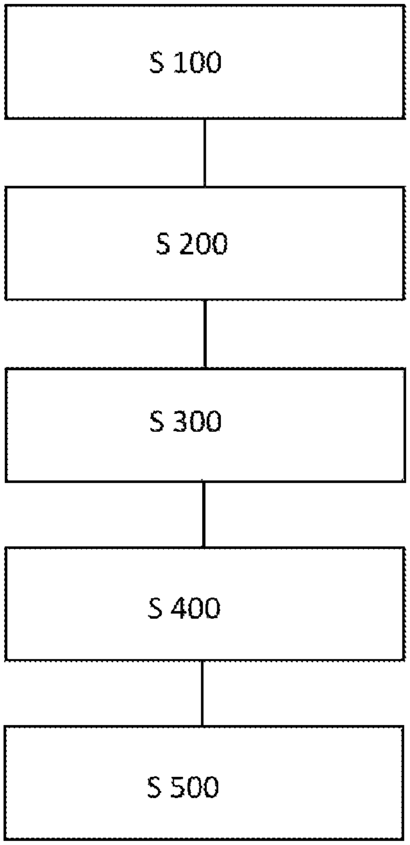
FIG. 6 is a flow chart showing the steps of the method for controlling a multilevel converter according to an embodiment of the present invention.

FIG. 6 is a flow chart showing the steps of the method for controlling a multilevel converter 1 according to an embodiment of the present invention.

According to the method for controlling the multilevel converter 1 according to an embodiment of the present invention, the method comprises, in step S100, providing a carrier signal for each of the plurality of power converter modules. As elaborated above, the carrier signals may have an asymmetrical waveform or a symmetrical waveform. An example of the asymmetrical waveform is the sawtooth waveform, for example as shown in FIG. 4. An example of the symmetrical waveform is the triangular waveform. Each of the carrier signals may have the same waveform. In the following, it will be assumed that the carrier signals have the sawtooth waveform as shown in FIG. 4, however, this is not limiting.

The method further comprises, in step S200, assigning, based on at least one first variable parameter, a first number N of the plurality of power converter modules to a first group G1 of power converter modules.

The at least one first variable parameter may be based on any one of temperature, current, voltage, state of health, demanded output voltage and a state of charge of each one of the plurality of energy sources, or a combination thereof. Additionally, or optionally, the at least one first variable parameter may be based on the demanded output voltage of the multilevel converter 1. The determination of the at least one first variable parameter may depend on the application environment of the multilevel converter 1 and on the specific application or functions of the multilevel converter 1. An example of an application environment is a battery system in a vehicle, for example an electric vehicle. An example of the specific function may include charging of the battery system or discharging of the battery system (providing energy to one or more components of the vehicle). For example, when the multilevel converter 1 is applied in a battery system of a vehicle, for example an electric vehicle, the battery system is used in discharging (providing energy to one or more components of the electric vehicle), the at least one first variable parameter may be based on the temperature and/or the state of charge of each one of the plurality of energy sources.

The method further comprises, in step S300, assigning, based on the at least one first variable parameter, at least one second number M of the plurality of power converter modules to at least one second group G2 of power converter modules. The wording "at least one second group" is to be understood as "at least one further group".

The method further comprises, in step S400, controlling the switching state of each of the first number N of the plurality of power converter modules assigned to the first group G1 based on the carrier signal provided for each of the first number N of the plurality of power converter modules for generating a first output signal, and in step S500, controlling the switching state of each of the at least one second number M of the plurality of power converter modules assigned to the at least one second group G2 based on the carrier signal provided for each of the at least one second number M of the plurality of power converter modules for generating a second output signal.

The carrier signals provided for each of the first number N of the plurality of power converter modules form a first group of carrier signals and the carrier signals provided for each of the at least one second number M of the plurality of power converter modules form a second group of carrier signals. The first group of carrier signals is phase shifted with respect to the second group of carrier signals for a group phase shift ($\varphi_{gj}$).

The group phase shift ($\varphi_{gj}$) may be calculated with the following equation:

$$\varphi_{gj} = \frac{j-1}{n} T_{SW} \tag{2}$$

Where $j \in \{1, \ldots, n\}$, where n is the number of groups and $T_{SW}$ is the switching period.

In other words, the group phase shift ($\varphi_{gj}$) may depend on the length of the period of the required output signal (switching period $T_{SW}$) and the number of groups of power converter modules.

As elaborated above, FIG. 4 shows an embodiment of the present invention in which four groups are formed out of twelve power converter modules. In the shown embodiment, a first number N (N=3) of the plurality of power converter modules is assigned to the first group G1, a second number M (M=3) of the plurality of power converter modules is assigned to the second group G2, a third number K (K=3) of the plurality of power converter modules is assigned to the third group G3 and a fourth number L (L=3) of the plurality of power converter modules is assigned to the fourth group G4. However, this is not limiting. It is sufficient that at least two groups are formed and in at least one group the number of power converter modules is 2 or more than two. Accordingly, in embodiments of the present invention, N is 1 or larger than 1 and M is 2 or larger than 2. Further, the number of groups does not need to be four as in the embodiment shown in FIG. 4. However, the maximum number of groups of power converter modules is for one smaller than the number of levels of the required multilevel output signal of the multilevel converter 1. Further, it is not necessary that all power converter modules of the multilevel converter 1 are assigned to a particular group. Further, it is possible that even if a power converter module is assigned to a group, the modulation index of the power converter module is 0.

The first output signal is phase shifted with respect to the second output signal for the group phase shift. The first output signal and the second output signal may comprise the same number of changes of the signal between a first amplitude level and a second amplitude level, however, this is not mandatory. In other words, the first output signal and the second output signal may be two equivalent signals that are phase shifted with respect to each other for the group phase shift.

The switching state and hence the scheduling of each power converter module 10_*i* (when to place the power converter modules 10_*i* to be in a conduction state and hence switch from a non-conduction state or a paralleled converter modules configuration state or bypassing state to the conduction state) is controlled based on the comparison between a corresponding reference signal R and the corresponding carrier signal.

A power converter module being in a conduction state actively contributes to the generation of the required output signal or in other words to the distribution of the workload (load in the multilevel converter 1). A power converter module being in a non-conduction state, or a paralleled converter modules configuration state or bypassing state does not actively contribute to the generation of the required output signal, or in other words to the distribution of the workload (load in the multilevel converter 1). For example, the output voltage of the power converter module when in a non-conduction state may be 0V. It is to be noted that each one of the non-conduction state, or a paralleled converter modules configuration state or bypassing state may also be called an inactive state. The conduction state may also be called active state. The non-conduction state of the at least one power converter module 10_*i* does not necessarily mean that for the at least one power converter module 10_*i* which is in a non-conduction state each element of the power converter module 10_*i* is in a non-conduction state. For example, when the at least one power converter module 10_*i* is in the non-conduction state, at least one of the two switching elements 12 of the power converter module 10_*i* may be in a conduction state to thereby bypass the energy source 11 connected to the power converter module 10_*i*.

Therefore, the method for controlling the multilevel converter 1 in the embodiment of the present invention may comprise further providing a first reference signal for controlling the switching state of each of the first number N of the plurality of power converter modules and a second reference signal for controlling the switching state of each of the at least one second number M of the plurality of power converter modules.

In embodiments of the present invention the first reference signal and the second reference signal may be the same signal. In other words, in embodiments of the present invention, the method may comprise providing a single reference signal (a general reference signal) for each of the at least one first group and the at least one second group. The single reference signal may be provided or generated on a system level, by way of example, by a central controller. In other embodiments of the present invention, a reference signal may be generated for each of the groups. In other words, the first reference signal and the second reference signal may be different reference signals.

The second reference signal may be split to M second reference signal components based on the at least one first variable parameter. For N larger than 1, the first reference signal may be split to N first reference signal components based on the at least one first variable parameter. For N=1, the first reference signal may be used as a first reference signal component for the one power converter module.

The reference signal component provided to each of the power converter modules assigned to the corresponding group may be determined based on the reference signal provided for the group and a difference for the reference signal component. The difference for the reference signal component may be the difference of the reference signal component from the reference signal provided for the group. Normally the difference for the reference signal component is determined by a higher order entity in the system.

In one embodiment of the present invention the following equation is satisfied:

$$d = d_{gj} = \sum_{i=1}^{m} d_{gj,i} = \sum_{i=1}^{m} \frac{d}{m} + \Delta d_i \tag{3}$$

where, as elaborated above, $j \in \{1, \ldots, n\}$, n is the number of groups and m is the number of power converter modules in the group. d is the general reference signal. In this equation, the general reference signal d is the same for each group and hence $d=d_{gj}$, $d_{gj}$ being the reference signal provided for the group with index j. $d_{gj,i}$ is the reference signal component for the corresponding power converter module with index i in the corresponding group j. $\Delta d_i$ is the difference for the reference signal component for the corresponding power converter module with index i in the group j.

It further applies:

$$0 = \sum_{i=1}^{m} \Delta di \tag{4}$$

Accordingly, the switching state of each power converter module 10_*i* assigned to the at least one first group and the at least one second group is controlled by comparing the corresponding carrier signal with the corresponding reference signal component $d_{gj,i}$. Based on the comparison, a control signal is generated for controlling the switching state of the corresponding power converter module 10_*i*.

In other words, controlling the switching state of each of the first number N of the plurality of power converter modules for generating a first output signal comprises comparing for each of the first number N of the plurality of power converter modules the corresponding carrier waveform signal with the corresponding first reference signal component and providing a control signal for controlling the switching state based on the comparison. Controlling the switching state of each of the at least one second number M of the plurality of power converter modules for generating a second output signal comprises comparing for each of the second number M of the plurality of power converter modules the corresponding carrier waveform signal with the corresponding second reference signal component and providing a control signal for controlling the switching state based on the comparison.

For each power converter module 10_*i*, the control signal may be a signal, for example a voltage signal, applied at least to a corresponding terminal of one of the switching elements of the power converter module 10_*i*.

In one or more embodiments of the present invention, the sum of the N first reference signals components may be equal to the first reference signal and the sum of the M second reference signal components may be equal to the second reference signal. In other words, for the reference signal components for the first number N of the plurality of power converter modules assigned to the first group and for the reference signal components for the at least one second number M of the plurality of power converter modules assigned to the second group as indicated with equation (3) above, the following applies:

$$d_{gj} = \sum_{i=1}^{m} d_{gj,m} \tag{5}$$

$$d_{g1} = \sum_{i=1}^{N} d_{g1,i}, \text{ and}$$

$$d_{g2} = \sum_{i=1}^{m} d_{g2,i}$$

In each of the groups to which more than two power converter modules are assigned, the corresponding carrier signals provided to the power converter modules are phase shifted with respect to each other.

In general, for the above-described sawtooth carrier signals, the following applies for the phase shift of the carrier signals for each group:

$$\varphi_{gj,i} = \varphi_{gj} + \sum_{i=2}^{m}\left(\frac{d}{m} + \Delta d_{i-1}\right)\cdot T_{SW} \tag{6}$$

$\varphi_{gj,i}$ is the phase shift for the i-th power converter in the j-th group, $\varphi_{gj}$ is the group phase shift for the j-th group and $T_{SW}$ is the switching period of the demanded voltage signal from the multilevel converter 1. The lower value for the index i is 2.

Hence, in each of the groups, the phase shift between the carrier signals depends on the group phase shift. Since, the phase group shift is calculated based on equation (2), in each of the groups, the phase shift between the carrier signals within each group depends on the number of groups and the length of the period of the required output signal. Further, the phase shift depends further on the reference signal components.

In embodiments of the present invention in which in at least one group only one power converter module is assigned to the group, the following applies:

$$\varphi_{gj,1} = \varphi_{gj} \tag{7}$$

In the above-described embodiment, in which the second number M of power converter modules are assigned to the second group G2, the carrier signals for each of the second number M of the plurality of power converter modules are phase shifted with respect to each other. The carrier signals for each of the second number M of the plurality of power converter modules are phase shifted with respect to each other such that the raising edges of the control signals are phase shifted with respect of each other and the falling edges of the control signals are phase shifted with respect to each other.

In the above-described embodiment, in which N is 2 or larger than two, the carrier signals for each of the first number N of the plurality of power converter modules are phase shifted with respect to each other. The carrier signals for each of the first number N of the plurality of power converter modules are phase shifted with respect to each other such that the raising edges of the control signals are phase shifted with respect to each other and the falling edges of the control signals are phase shifted with respect to each other.

It is noted that within each group it is not mandatory that the carrier signals are shifted for the same phase shift. In other words and by way of example, for the case when five carrier signals are assigned in a group there are four phase shifts for the group. It is possible that all four phase shifts are the same or all are different from each other or at least two are different from each other.

As evident from equation (6), in the first group the phase shift depends on the length of the period of the required output signal and the first reference signal components. In the second group the phase shift depends on the length of the period of the required output signal and the second reference signal components. In other words, in each of the groups the phase shift between the carrier signals depends on the length of the period of the required output signal and the second reference signal components.

In each of the control signals, each change of the waveform from a first amplitude level to a second amplitude level defines a raising edge of each of the control signals. Each change of the waveform from the second amplitude level to the first amplitude level defines a falling edge of each of the control signal.

The carrier signals in each of the groups are phase shifted with respect to each other to align rising and falling edges of the corresponding control signals. With this, a uniform switching pattern is generated since the same output signal is obtained from each of the groups. Further, in this way, the generation of harmonics at the power converter module switching rate may be avoided. The expression "switching pattern" may be seen as the collection of switching states of the power converter modules assigned to the group for the period of the required output signal.

In other words, in a preferred embodiment of the present invention, within each of the first group and the at least one second group, the carrier signals are phase shifted with respect to each other to align, except for the first and the last carrier waveform signal, the raising and the falling edges of the control signals for the power converter modules of the group.

Figure 7:
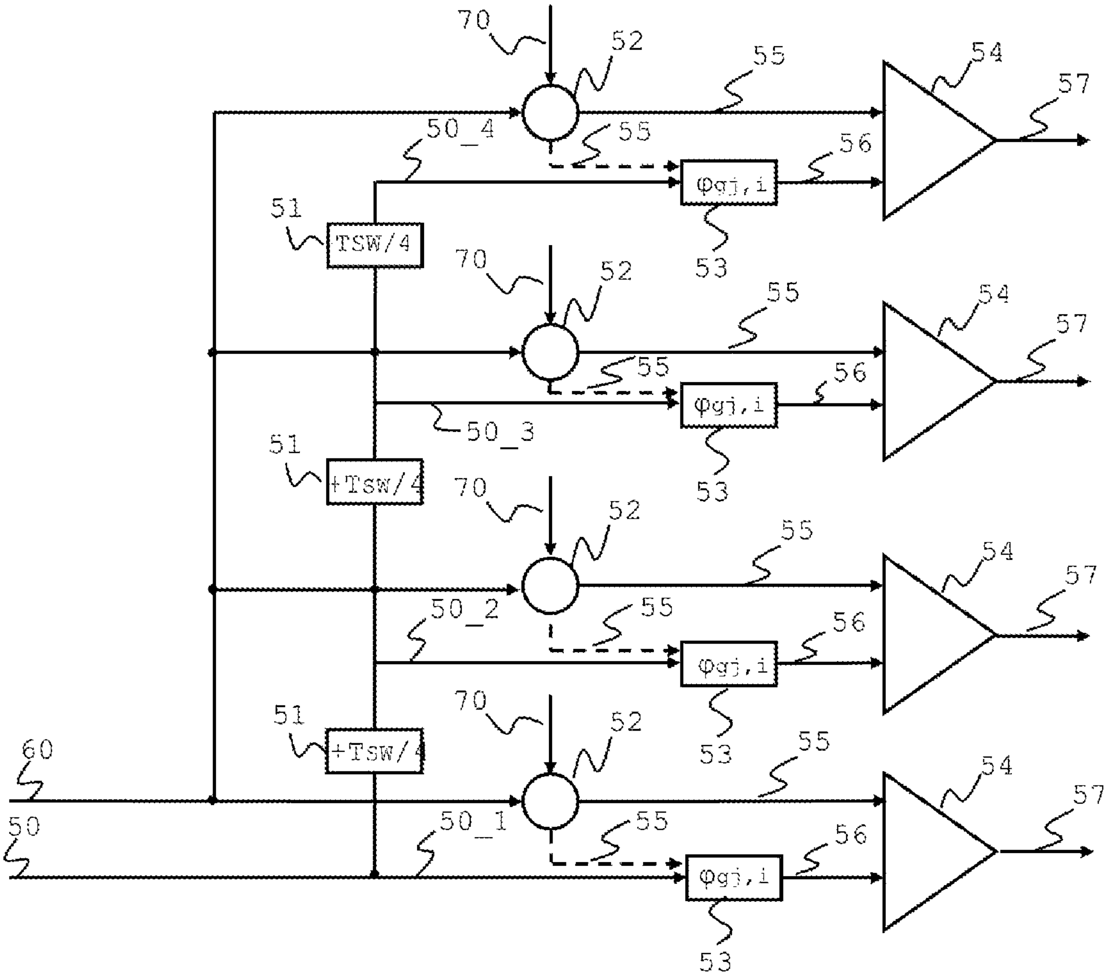
FIG. 7 is a block diagram for applying the modulation technique according to the present invention.

The block diagram to apply the modulation technique described above in one embodiment of the present invention is shown in FIG. 7 for four groups of power converter modules. Each group comprises three power converter modules. There is shown in FIG. 7 providing a carrier signal 50 for each of the plurality of power converter modules in each of the four groups. The carrier signals are separated for the different power converter modules of the different groups. The first carrier signals group 50-1 represents the carrier signals for the power converter modules assigned to the first group, the second carrier signals group 50-2 represents the carrier signals for the power converter modules assigned to the second group, the third carrier signals group 50-3 represents the carrier signals for the power converter modules assigned to the third group and the fourth carrier signals group 50-4 represents the carrier signals for the power converter modules assigned to the fourth group.

As can be seen in FIG. 7, the carrier signal groups for the power converter modules assigned to each of the second group, the third group and the fourth group are phase shifted 51 for a +Tsw/4 (the phase group shift). In other words, the second carrier signals group 50-2 is phase shifted with respect to the first carrier signals group 50-1 for +Tsw/4, the third carrier signals group 50-3 is phase shifted with respect to the second carrier signals group 50-2 for +Tsw/4 and the fourth carrier signals group 50-4 is phase shifted with respect to the third carrier signals group 50-3 for +Tsw/4.

The demanded modulation index 60 for the required output signal is also provided in the control diagram as well as the modulation index modification 70 for each of the power converter modules assigned to the corresponding group. As elaborated above, any mathematical operation can be used for modulation index modification for individual power converter modules in each of the groups, such as addition, subtraction or multiplication. Based on the demanded modulation index and the modulation index modification, the reference signal component 55 for each power converter module is determined in block 52. The reference signal 55 for each power converter module is sent to the corresponding comparator 54. Optionally, the reference signal 55 may also be sent to block 53, elaborated further below.

In block 53, for each group, for each power converter module assigned to the group, using equation (6), the phase shift between the carrier signals in the group is calculated. The phase shifted carrier signals 56 for each power converter module assigned to the group is sent to the comparator 54. Accordingly, for each group, 3 carrier signals 56 are sent to the corresponding comparator 54.

In the comparator 54, the reference signal for each power converter module is compared with the carrier signal for each power converter module and based on the comparison a control signal 57 is generated for controlling the switching state of each of the power converter modules.

The reference signal component $d_i$ for a corresponding power converter module **10_*i*** in general satisfies the equation:

$$0 \leq d_i \leq 1 \tag{8}$$

Figure 8:
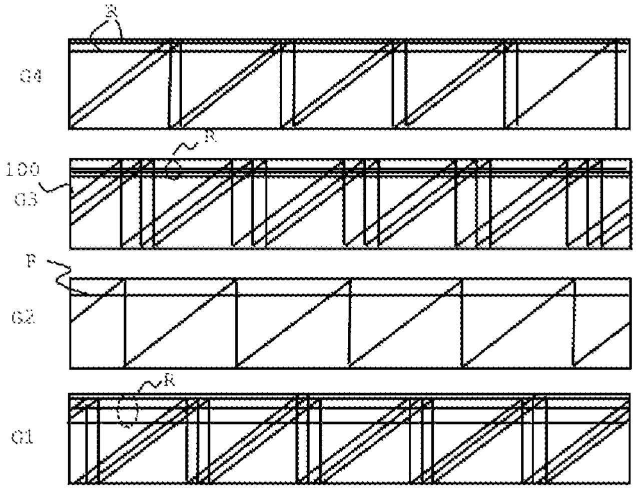
FIG. 8 shows a modulation technique according to an embodiment of the present invention.

There is shown in FIG. 8 the carrier waveform signals and the reference component signals in an embodiment of the present invention in which in the first group G1 three power converter modules are assigned, in the second group G2 one power converter modules is assigned, in the third group G3 three power converter module is assigned and in the fourth group G4 two power converter modules are assigned. The corresponding reference component signals (denoted with R in the figure) $d_{gj,i}$ where $i \in \{1, \ldots m\}$, where m is the number of power converter modules assigned to the group are also shown.

The reference signal component of a corresponding power converter module may be determined with the following equation:

$$d_i = \frac{d}{n_{group,j}} + \Delta d_i, \tag{9}$$

where d is the duty ratio demanded by the multilevel converter 1, $d_i$ is the duty ratio (reference signal component) of the power converter module **10_*i*, $n_{group,j}$ is the number of power converter modules assigned to the group and $\Delta d_i$ is the duty ratio difference of the power converter module 10_*i***. It is to be understood that "duty ratio" and "reference signal" are used interchangeably throughout the description of the embodiments of the present invention.

Figure 9:
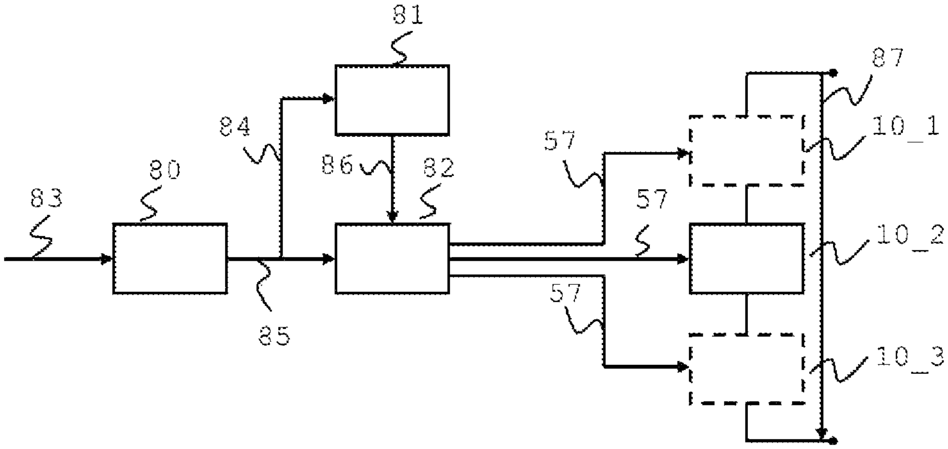
FIG. 9 shows a block diagram of the multilevel converter according to an embodiment of the present invention.

There is shown in FIG. 9 a block diagram of the multilevel converter according to an embodiment of the present invention. In this embodiment of the present invention, two groups of power converter modules are formed. Two power converter modules 10_1, 10_3 are assigned to the first group and one power converter module 10_2 is assigned to the second group. The power converter modules are connected in a string, the output voltage 87 of the power converter modules 10_1, 10_2 and 10_3 is the voltage between the first and the last power converter module in the string. The block diagram comprises further a control unit 80, a group unit 81 and a modulator unit 82 for carrying out the steps of the method for controlling the multilevel converter 1.

The control unit 80, the group unit 81 and the modulator unit 82 may be functional or logical units within one or more hardware units. In other embodiment of the present invention they me be separate hardware units. In any case, at least one processing unit may carry out the function of each one or even all of the described units. The at least one processing unit may be any suitable unit or comprise any suitable unit that can perform computer processing. The processing unit may comprise any of a micro processing unit (MCU), a field programmable gate array (FPGA) or application specific integrated circuit (ASIC), a complex programmable logic device (CPLD) or a combination thereof. The processing unit may comprise a storage unit, such as a memory (not shown in the figure). Alternatively, or additionally, one or more memories may be provided in addition to the at least one processing unit. The one or more memories may store different information required for the processing by the at least one processing unit.

The control unit 80 may be arranged to receive the demanded output voltage 83 of the multilevel converter 1. The control unit 80 may be arranged to send a signal 85 carrying an information regarding the demanded output voltage to the modulator unit 82. The information may be an information regarding the amplitude of the demanded voltage signal, the number of levels of the demanded voltage signal and similar. The modulator unit 82 may be arranged to generate the control signals for controlling the switching state of each of the power converter modules. The group unit 81 may be arranged to perform assignment of the power converter modules to the corresponding first group and second group based on the first variable parameter. For the assignment, the group unit 81 may be arranged to use an information 84 received from the control unit 80. The information may be information regarding any one of temperature, current, voltage, state of health, demanded output voltage and state of charge of each one of the plurality of energy sources in each one of the plurality of power converter modules. Additionally, or optionally, the information may be information regarding the demanded output voltage of the multilevel converter 1. The referred voltage may be understood to be a measured physical value, while the demanded output voltage may be understood as a reference value that is a virtual value requested by the control unit 80. The group unit 81 may be configured to determine the at least one first variable parameter for performing the assignment based on the information. The group unit 81 may be further configured to determine the group phase shift as well as the phase shift between the carrier signals in each of the groups. In this embodiment, since one power converter module 10_2 is assigned to the second group, the phase shift for the one power converter module 10_2 corresponds to the group phase shift. The group unit 81 may be arranged to send an information 86 to the modulator unit 82 regarding the group phase shift and the phase shift between the carrier signals in each of the groups. The modulator unit 82 may be arranged to issue the control signals for each one of the plurality of power converter modules.

Figure 10:
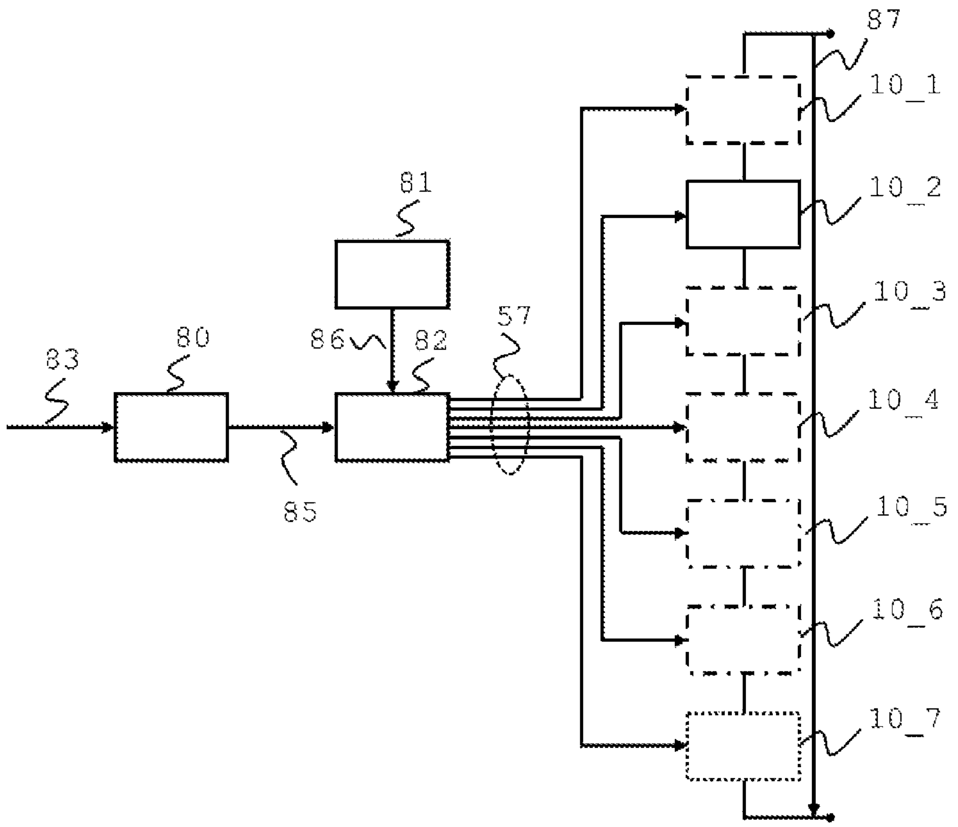
FIG. 10 shows a block diagram of the multilevel converter according to an embodiment of the present invention.

There is shown in FIG. 10 a further embodiment of the present invention. In this embodiment of the present invention three power converter modules 10_1, 10_3 and 10_4 are assigned to the first group, one power converter module 10_2 is assigned to the second group, two power converter modules 10_5 and 10_6 are assigned to the third group and one power converter module 10_7 is assigned to the fourth group. The functions of the control unit 80, the group unit 81 and the modulator unit 82 are the same as in the embodiment described with reference to FIG. 9. In FIG. 10 there is no sending of information regarding the determination of the first variable parameter from the control unit 80 to the group unit 81. This set is optional. This step may be performed for each control cycle, or for a number of control cycles. In other words, the determination of the first variable parameter may be dynamic or semi-persistent.

Figure 11:
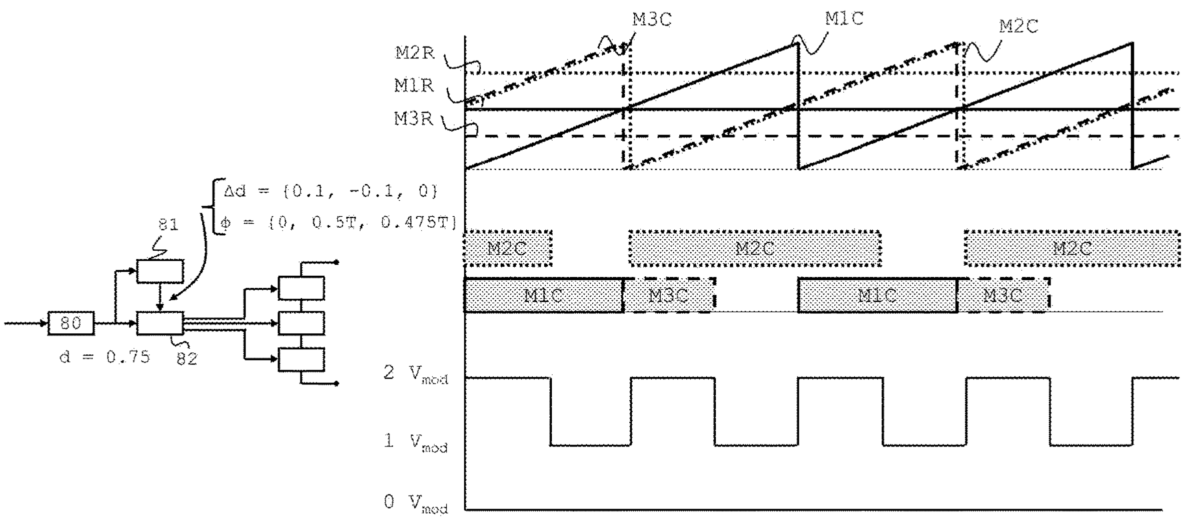
FIG. 11 shows waveforms of the demanded voltage and the output voltage of the multilevel converter as well as of control signals in one embodiment of the present invention.

There is shown in FIG. 11 waveforms of the input demanded voltage and the demanded output voltage of the multilevel converter 1 in one embodiment of the present invention. In this embodiment of the present invention two groups of power converter modules 10_1, 10_2, 10_3 are formed as shown in the embodiment elaborated with reference to FIG. 9. The number of levels of the demanded output voltage is 1.5.

In the upper part, the reference signal components M1R, M2R, M3R and the carrier signals M1C, M2C, M3C for the power converter modules 10_1, 10_2, 10_3 are shown. In the lower graph, the demanded output voltage of the multilevel converter is shown. In the middle part, the control signals M1C, M2C, M3C for each of the power converter modules are shown for controlling the power converter modules to be in the conduction state. As elaborated above, the control signal for controlling each of the power converter modules to be in a conduction state is generated based on the comparison of the corresponding reference signal component and the corresponding carrier signal for the corresponding power converter module.

As evident from the upper graph, when the reference signal for a corresponding one power converter module 10_1, 10_2, 10_3 is above the carrier signal, the control signal is issued for controlling the corresponding power converter module to be in a conduction state. The control signal may therefore exhibit a raising edge. When the reference signal for a corresponding one power converter module 10_1, 10_2, 10_3 is below the carrier signal, the control signal is issued for controlling the corresponding power converter module to switch from the conduction state in one of a non-conduction state, a parallel configuration state or a bypassed state. The control signal may therefore exhibit a falling edge.

There is shown in FIG. 11 that the falling edge of the control signal for the power converter module 10_1 is aligned with the rising edge of the control signal for the power converter module 10_3. It is to be understood that the first power converter module in the group (the power converter module with the highest reference signal) will not have the raising edge of the control signal aligned with anything and the last power converter module in the group (the power converter module with the lowest reference signal) will not have the falling edge aligned with anything.

In this embodiment of the present invention, the control unit 80 receives an information regarding the demanded voltage of the multilevel converter and based on this information determines the duty ratio of the multilevel converter. It further determines $T_{SW}$. In this embodiment, the duty ratio d is 0.75. The control unit 80 determines further the duty ratio differences of the corresponding power converter modules. In this embodiment, the differences of the corresponding power converter modules are 0.1, −0.1 and 0. The control unit gives this information to the group unit 81. The group unit performs the assignment of the power converter modules to the first group or the second group. The group control unit 81 determines the duty ratios of the corresponding power converter modules based on equation 9. In other words, the following is determined:

$$d1 = \frac{0.75}{2} + 0.1 = 0.475$$

-continued $$d2 = \frac{0.75}{1} + 0.0 = 0.75$$

$$d3 = \frac{0.75}{2} - 0.1 = 0.275$$

The corresponding reference signals when expressed in V are therefore: 0.475V for the power converter module 10_1, 0.75 V for the power converter module 10_2 and 0.275 V for the power converter module 10_3.

The group phase shifts are determined based on equation (2) from above.

In this embodiment, therefore, the following is determined:

$$\varphi_{g1} = \frac{0}{2}T_{SW}$$

$$\varphi_{g2} = \frac{1}{2}T_{SW}$$

The corresponding power converter modules phase shift within each group are determined based on equation (6) for group 1 and equation (7) for group 2.

In this embodiment, therefore, the following is determined:

$$\varphi_{g1,1} = \frac{0}{2}T_{SW}$$

$$\varphi_{g1,2} = \frac{0}{2}T_{SW} + \left(\frac{0.75}{2} + 0.1\right)\cdot T_{SW}$$

$$\varphi_{g2,1} = \frac{1}{2}T_{SW}$$

The group unit 81 sends to the modulator unit 82 the differences in the duty ratio for the corresponding power converter modules and the phase shifts of the carrier signals within each group. The modulator unit 82 then issues the corresponding control signals.

Further, once the difference for the reference signal component $\Delta d_i$ for each power converter module is determined, the first number N of the plurality of power converter modules is assigned to the first group and at least one second number M of the plurality of power converter modules is assigned to at least one second group, and the phase shift for the individual power converter modules within each group is calculated, the values and the assignment may be kept for the entire generation of the required output voltage of the multilevel converter or may ne re-calculated and the assignment may be performed again. For example, when using the multilevel converter in solar panels, as one possible exemplary environment, it may be advantageous to re-calculate the values and perform the assignment again depending on the change in the state of charge of the energy sources. For example, during one period of the day, the energy sources that are more exposed to sunlight during that period of the day may be more heavily used, while during other period of the day other energy sources that are more exposed to sunlight during the other period of the day may be more used.

In one embodiment of the present invention, a multilevel converter 1 is provided comprising a plurality of energy sources 11 and a plurality of power converter modules 10_1, 10_2, 10_3, . . . , 10_*m*, each power converter module comprising at least two switching elements, the multilevel converter 1 comprising means adapted to execute the steps of the method of the one or more embodiments described above.

Further, in one embodiment of the present invention, a computer program comprising instructions is provided, which, when the program is executed by a computer causes the computer to execute the steps of the method of the one or more embodiments described above. Such instructions may be stored in one or more memories.

Hence, according to the present invention, a modulation technique for a multilevel converter is provided which allows for a phase-shifted operation which effectively increases the effective output switching rate. The provided modulation technique introduces in the same time a balancing capability. Further, the provided modulation technique does not introduce additional distortion at the module switching rate and its harmonics.

Although detailed embodiments have been described, these only serve to provide a better understanding of the invention defined by the independent claims and are not to be seen as limiting.

The invention claimed is:

1. A method for controlling a multilevel converter for generating a multilevel output signal, wherein the multilevel converter comprises a plurality of energy sources and a plurality of power converter modules, each power converter module comprising at least two switching elements, the method comprising:

providing a carrier signal for each of the plurality of power converter modules;

assigning, based on at least one first variable parameter, a first number N of the plurality of power converter modules to a first group of power converter modules;

assigning, based on the at least one first variable parameter, at least one second number M of the plurality of power converter modules to at least one second group of power converter modules;

providing a first reference signal for controlling a switching state of each of the first number N of the plurality of power converter modules and a second reference signal for controlling a switching state of each of the at least one second number M of the plurality of power converter modules;

controlling the switching state of each of the first number N of the plurality of power converter modules assigned to the first group based on the carrier signal provided for each of the first number N of the plurality of power converter modules for generating a first output signal; and controlling the switching state of each of the at least one second number M of the plurality of power converter modules assigned to the at least one second group based on the carrier signal provided for each of the at least one second number M of the plurality of power converter modules for generating a second output signal;

wherein the carrier signals provided for each of the first number N of the plurality of power converter modules form a first group of carrier signals and the carrier signals provided for each of the at least one second number M of the plurality of power converter modules form a second group of carrier signals, wherein the first group of carrier signals is phase shifted with respect to the second group of carrier signals for a group phase shift;

wherein N is 1 or larger than 1, wherein M is 2 or larger than 2, wherein a maximum number of groups of power converter modules is for one smaller than a number of levels of a required multilevel output signal;

wherein the first output signal is phase shifted with respect to the second output signal for the group phase shift, wherein the first output signal and the second output signal comprise a same number of changes of the signal between a first amplitude level and a second amplitude level.

2. The method of claim 1, further comprising splitting the second reference signal to M second reference signal components based on the at least one first variable parameter and further comprising, for N larger than 1, splitting the first reference signal to N first reference signal components based on the at least one first variable parameter and for N=1 using the first reference signal as a first reference signal component for the one power converter module.

3. The method of claim 2, wherein the at least one first variable parameter is based on any one of temperature, current, voltage, state of health, demanded output voltage, and a state of charge of each one of the plurality of energy sources.

4. The method of claim 2, wherein controlling the switching state of each of the first number N of the plurality of power converter modules for generating the first output signal comprises comparing for each of the first number N of the plurality of power converter modules a corresponding carrier waveform signal with a corresponding first reference signal component and providing a control signal for controlling the switching state based on the comparison;

wherein controlling the switching state of each of the at least one second number M of the plurality of power converter modules for generating the second output signal comprises comparing for each of the second number M of the plurality of power converter modules the corresponding carrier waveform signal with the corresponding second reference signal component and providing a control signal for controlling the switching state based on the comparison.

5. The method of claim 2, wherein a sum of the N first reference signal components is equal to the first reference signal, wherein the sum of the M second reference signal components is equal to the second reference signal.

6. The method of claim 1, wherein the first reference signal and the second reference signal are a same reference signal.

7. The method of claim 1, wherein each of the carrier signals has a same waveform, wherein the waveform is a symmetrical or asymmetrical waveform.

8. The method of claim 1, wherein the carrier signals for each of the second number M of the plurality of power converter modules are phase shifted with respect to each other for a second phase shift; and wherein for N equals 2 or larger than two, the carrier signals for each of the first number N of the plurality of power converter modules are phase shifted with respect to each other.

9. The method of claim 4, wherein in each of the control signals, each change of a waveform from a first amplitude level to a second amplitude level defines a raising edge of each of the control signals, wherein each change of the waveform from the second amplitude level to the first amplitude level defines a falling edge of each of the control signals;

wherein the carrier signals for each of the first number N of the plurality of power converter modules, for N equals 2 or larger than 2 are phase shifted with respect to each other such that the raising edges of the control signals are phase shifted with respect to each other and the falling edges of the control signals are phase shifted with respect to each other, wherein the phase shift depends on a length of a period of a required multilevel output signal and the first reference signal components; and wherein the carrier signals for each of the second number M of the plurality of power converter modules are phase shifted with respect to each other such that the raising edges of the control signals are phase shifted with respect to each other and the falling edges of the control signals are phase shifted with respect to each other, wherein the phase shift depends on the length of the period of a required multilevel output signal and the second reference signal components.

10. The method of claim 9, wherein within each of the first group and the at least one second group, the carrier signals are phase shifted with respect to each other to align the raising and the falling edges of the control signals for the power converter modules of the group.

11. The method of claim 1, wherein the group phase shift depends on a length of a period of the required multilevel output signal and a number of groups of power converter modules.

12. A multilevel converter for generating a multilevel output signal, the multilevel converter comprising:

a plurality of energy sources and a plurality of power converter modules, each power converter module comprising at least two switching elements;

wherein the multilevel converter is configured to:

provide a carrier signal for each of the plurality of power converter modules;

assign, based on at least one first variable parameter, a first number N of the plurality of power converter modules to a first group of power converter modules;

assign, based on the at least one first variable parameter, at least one second number M of the plurality of power converter modules to at least one second group of power converter modules;

provide a first reference signal for controlling a switching state of each of the first number N of the plurality of power converter modules and a second reference signal for controlling a switching state of each of the at least one second number M of the plurality of power converter modules;

control the switching state of each of the first number N of the plurality of power converter modules assigned to the first group based on the carrier signal provided for each of the first number N of the plurality of power converter modules for generating a first output signal; and control the switching state of each of the at least one second number M of the plurality of power converter modules assigned to the at least one second group based on the carrier signal provided for each of the at least one second number M of the plurality of power converter modules for generating a second output signal;

wherein the carrier signals provided for each of the first number N of the plurality of power converter modules form a first group of carrier signals and the carrier signals provided for each of the at least one second number M of the plurality of power converter modules form a second group of carrier signals, wherein the first group of carrier signals is phase shifted with respect to the second group of carrier signals for a group phase shift;

wherein N is 1 or larger than 1, wherein M is 2 or larger than 2, wherein a maximum number of groups of power converter modules is for one smaller than a number of levels of a required multilevel output signal;

wherein the first output signal is phase shifted with respect to the second output signal for the group phase shift, wherein the first output signal and the second output signal comprise a same number of changes of the signal between a first amplitude level and a second amplitude level.

13. A non-transitory computer readable medium storing instructions which, when executed by a processor, cause the processor to execute the method of claim 1.

* * * * *